Inventor
Joseph J. Wampach

By
Attorney

May 19, 1931. J. J. WAMPACH 1,805,894
PARACHUTE
Filed Aug. 12, 1929 4 Sheets-Sheet 2
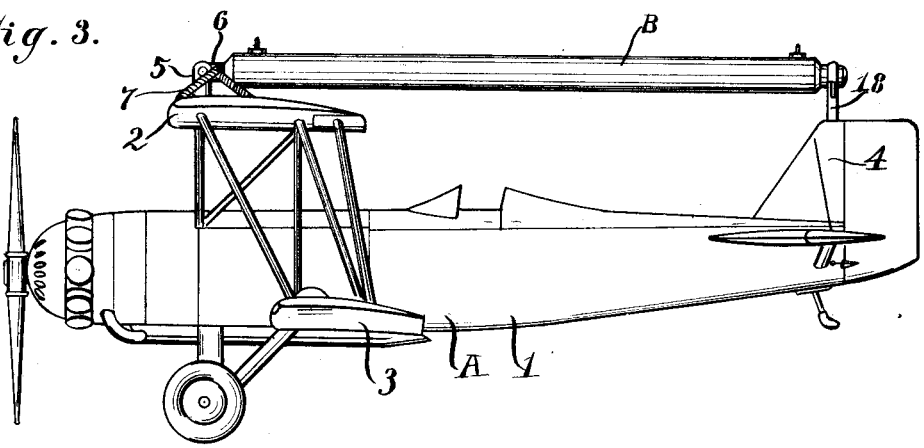
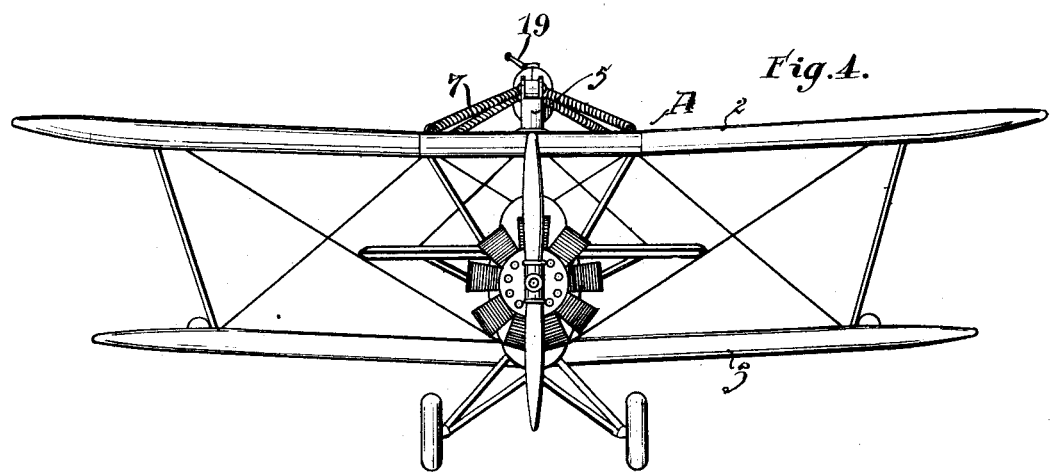
Inventor
Joseph J. Wampach

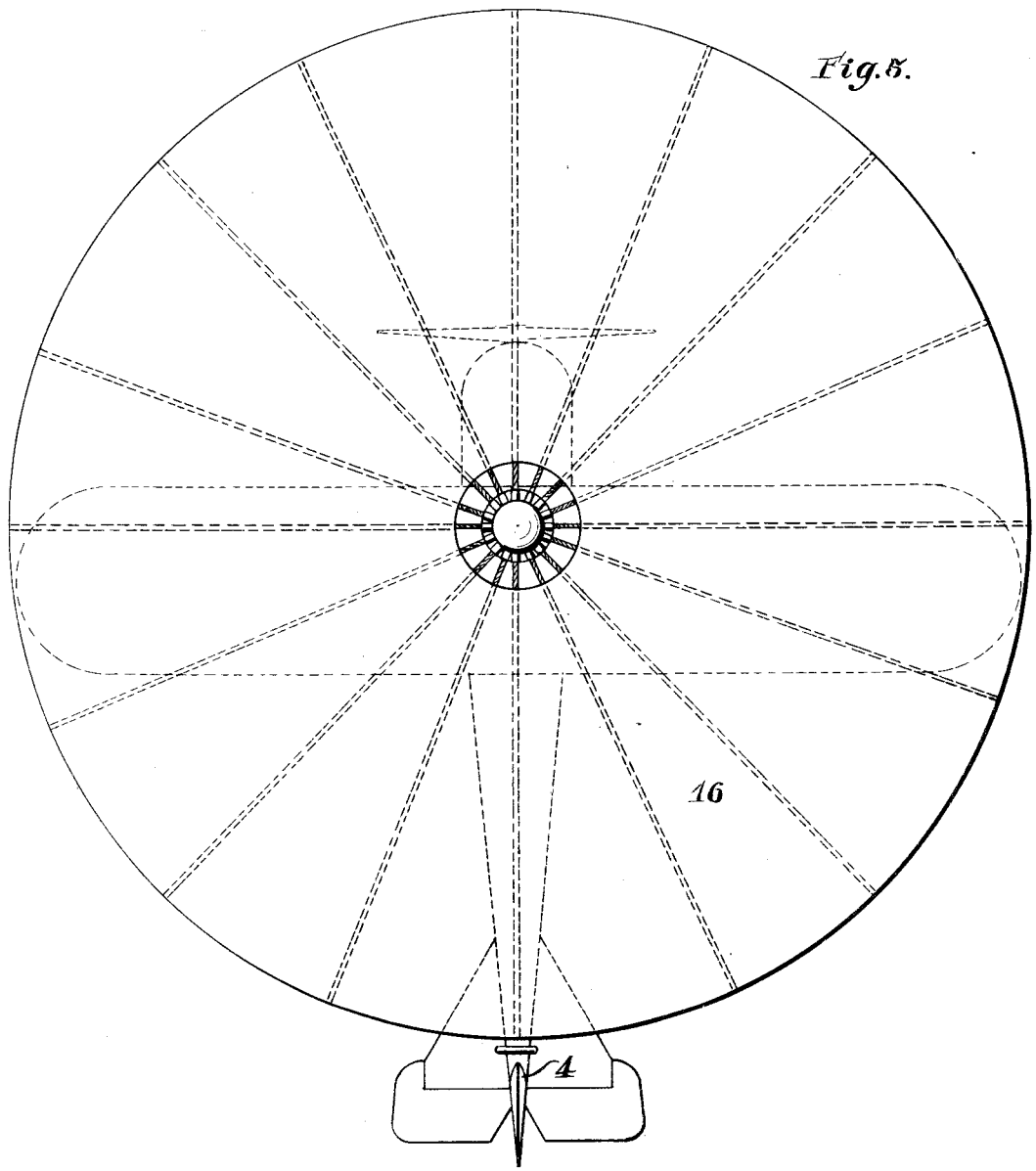

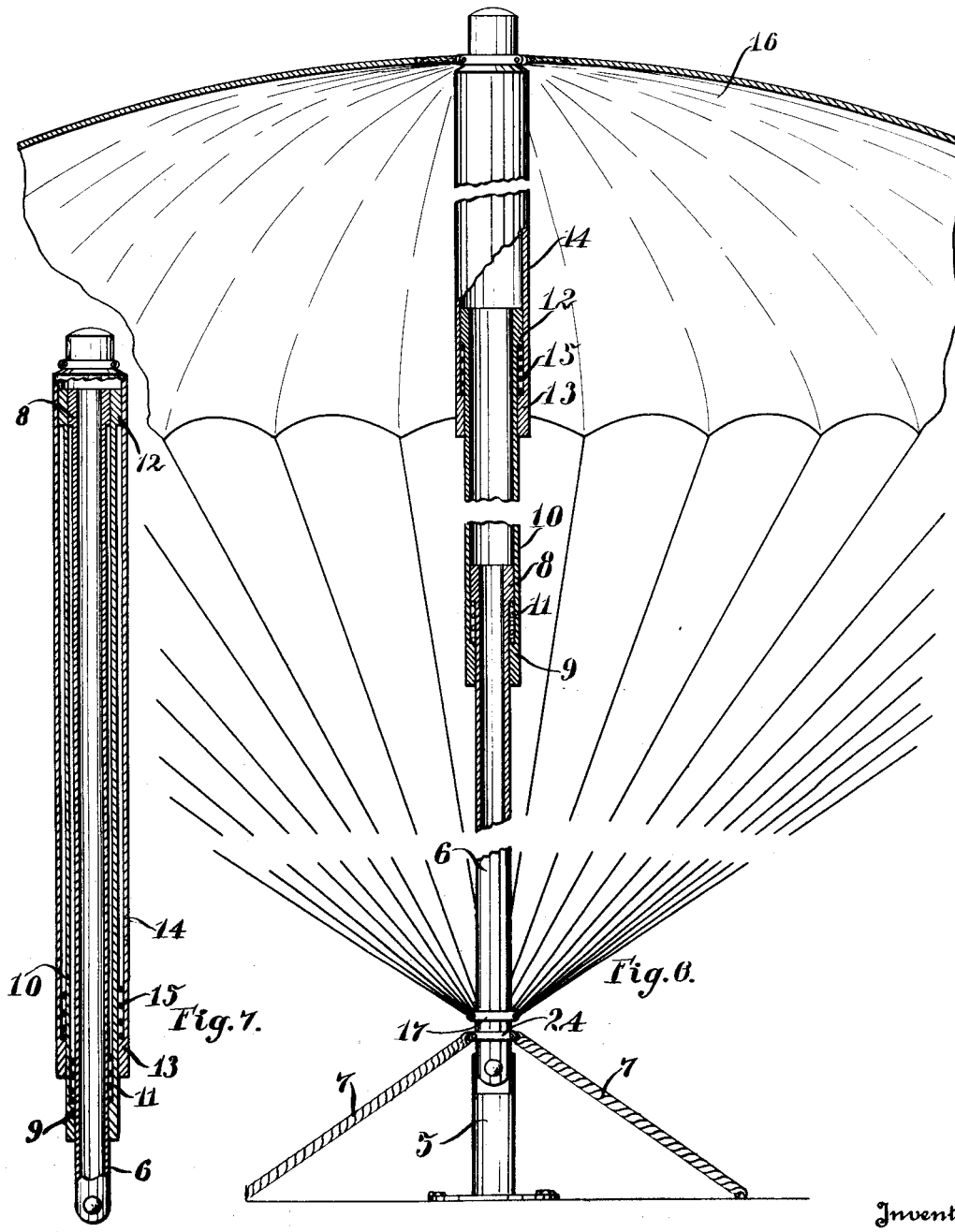

Patented May 19, 1931

1,805,894

UNITED STATES PATENT OFFICE

JOSEPH J. WAMPACH, OF ST. PAUL, MINNESOTA, ASSIGNOR OF ONE-HALF TO FRANK J. WAMPACH, OF JORDAN, MINNESOTA

PARACHUTE

Application filed August 12, 1929. Serial No. 385,093.

The present invention relates to an aircraft parachute and is particularly adapted to passenger carrying air-craft where it is desired to lower a plane to the ground by means of a parachute. This is desirable since it has been found that the providing of passengers with individual parachutes creates a mental hazard and also that a passenger who is not accustomed to flying is often afraid to jump when the necessity therefor arises.

An object of the present invention is to lower an air-craft by means of a parachute which is carried as an integral part of said air-craft.

In order to attain this object, there is provided, in accordance with one feature of the invention, a parachute carried in a releasable casing on a frame which is pivotally connected to the air-craft.

These and other features of the invention will be more fully brought out in the following description and the accompanying drawings, wherein:

Figure 3 is a view in side elevation of the structure shown in Figure 1.

Figure 4 is a view in front elevation thereof.

Figure 5 is a plan view of the device in an open or operative position.

Figure 6 is a vertical transverse sectional view of the parachute mechanism in an operative position, portions thereof being broken away to increase the scale of the drawings of the material portions of the device; and Figure 7 is a view, also in vertical section, showing a telescoping central supporting member in a collapsed or inoperative position.

Figure 1:
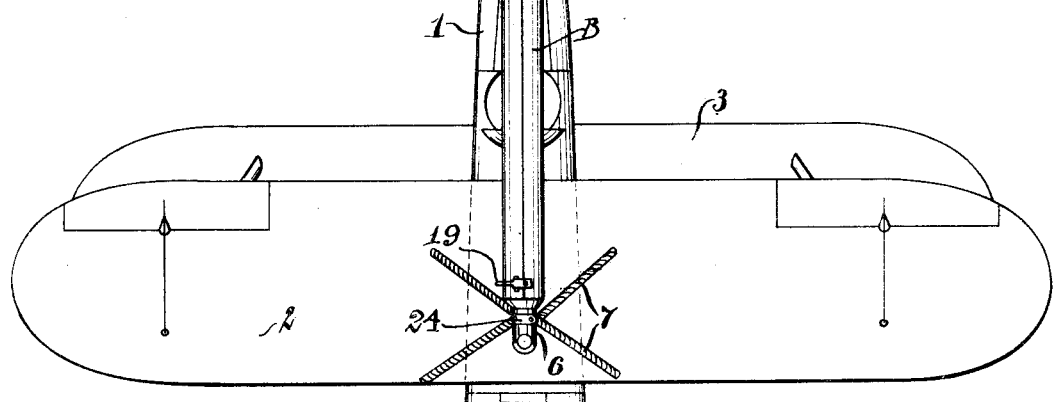
Figure 1 is a plan view of an airplane equipped with the device in folded or inoperative position.

Referring to the drawings in detail, an airplane A of the biplane type, comprises a fuselage 1 with upper and lower wings 2 and 3, an empennage 4. A post 5 is mounted on the center section of the upper wing to have a pivotal movement thereon, this post being firmly connected thereto to withstand the stresses imposed by the weight of the airplane when supported by the parachute. A tubular member 6 is pivotally connected to the post 5 and has connected thereto near the lower end thereof four radially extending springs 7 which assist in raising the parachute supporting structure to a vertical position on releasing said parachute and hold the post 5 in a vertical position after the plane is landed by means of the parachute. The tubular member 6 is provided with an outwardly extending flange 8 near the upper end thereof which engages an inwardly extending flange 9 of a second tubular member 10 which telescopes over the tubular member 6. A coil spring 11 is mounted in the space between the tubular members 6 and 10 to engage the flanges 8 and 9 thereof when the tubes are suddenly extended to partially absorb the shock of opening. The second tubular member 10 is provided with an outwardly extending flange 12 at the upper end thereof which engages an inwardly turned flange 13 on a third tubular member 14 in the same manner as that described for the flanges 8 and 9 on the first two members, a coil spring 15 being also provided in the opening between those two members for the same purpose as that described for the coil spring 11. A parachute canopy 16 is firmly connected to the outer end of the third tubular member 14, the risers for the parachute canopy being connected to a ring 17 near the lower end of the first tubular member 6.

Figure 2:
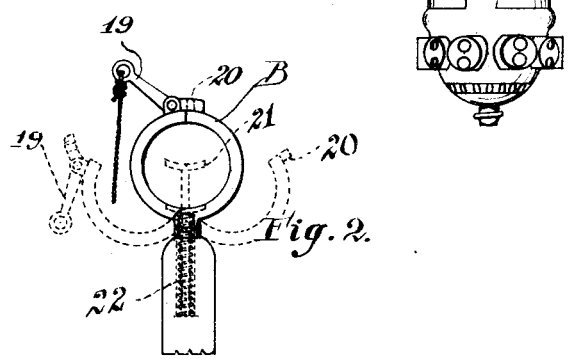
Figure 2 is a view in side elevation of a releasable clamp for holding the parachute mechanism.

A casing B for containing the parachute when in a folded condition is shown as being connected to the top of the rudder post 18 and to the short post 5 which pivotally supports the lower end of the extensible central parachute member. The casing comprises two semi-cylindrical portions which are hingedly connected at their lower edges to open outwardly to the dotted line position shown in Figure 2. The parachute is folded about the central post with the risers also folded in with the parachute and the casing B is opened to the dotted-line position shown in Figure 2 to receive the parachute in this folded condition. The two halves of the casing are then brought together to the solid line position shown in Figure 2 and a lever 19 is brought into engagement with a lug 20 to hold the two halves of the casing in a closed condition. A spring post 21 is mounted in the rear supporting post of the casing to normally occupy the raised dotted line position shown in Figure 2.

In enclosing the parachute within the casing, this post is forced down against the tension of the spring 22 into a recess in the bottom of the casing. When the two halves of the casing are released for opening by pulling the lever 19, the post 21 forces the parachute upwardly a slight distance to free it from the casing. Thereafter the action of the air stream on the parachute will force it to an open position in a manner which will be apparent to those versed in the art.

The parachute casing may be mounted in a blister on the side of the fuselage, or may be stream lined into a separate smaller nacelle above the fuselage to reduce the head resistance, the structure here shown being adopted merely for the purpose of showing the general features of construction, since it is apparent that considerable head resistance would be added with the device in its present condition with no attempt to stream line it.

The four springs 7 are connected radially from a ring 24 connected to the lower telescoping tube 6, to hold the tube in an upright position when the plane strikes the ground after being lowered by the parachute, and to prevent it from collapsing over onto the plane. When the plane strikes the ground the upward stresses on the two upper tubes will be relieved, and their weight will carry them downward over the lower tube. The parachute may then be re-folded and re-packed within the casing B.

I claim:

1. An aircraft parachute, comprising an extensible central frame member pivotally mounted on an airplane, each of the extensible portions of said frame having a shock absorbing member mounted between said frame member and the next extensible portion thereof to absorb the shock of opening thereof, the canopy of said parachute being connected to the outer portion of said extensible frame, the risers of said parachute being connected to said frame adjacent the point of pivotal support thereof, and a casing adapted to enclose said parachute and frame when in a folded collapsed position, said casing being split lengthwise and adapted to open to release the parachute therefrom.

2. In a parachute for aircraft, a support member securely mounted on said aircraft, a tubular member having swivel connection therewith, tubular means having telescopic connection with said first tubular means to be extensible with respect thereto, spring stop means to resiliently limit the extension of said tubular extensible means, a parachute connected to said tubular extensible means, a plurality of risers connected to the periphery of said parachute and to a point adjacent the base of said extensible means, and a plurality of radially disposed springs connected to said aircraft and to said first tubular member beyond the swivel connection with said supporting member, said radially disposed springs being adapted to normally retain said tubular member in position perpendicular to the longitudinal axis of the aircraft.

In testimony whereof I affix my signature.

JOSEPH J. WAMPACH.